United States Patent
Gonze et al.

(10) Patent No.: US 8,720,193 B2
(45) Date of Patent: May 13, 2014

(54) HYBRID CATALYST RADIANT PREHEATING SYSTEM

(75) Inventors: Eugene V. Gonze, Pinckney, MI (US); Halim G. Santoso, Novi, MI (US); Brian L. Spohn, Holly, MI (US); Bryan Nathaniel Roos, Novi, MI (US)

(73) Assignee: GM Global Technology Operations LLC

( * ) Notice: Subject to any disclaimer, the term of this patent is extended or adjusted under 35 U.S.C. 154(b) by 558 days.

(21) Appl. No.: 12/777,662

(22) Filed: May 11, 2010

(65) Prior Publication Data

US 2011/0277449 A1    Nov. 17, 2011

(51) Int. Cl.
F01N 3/00    (2006.01)
F01N 3/10    (2006.01)

(52) U.S. Cl.
USPC ............ 60/303; 60/300; 60/285; 60/297

(58) Field of Classification Search
USPC ............................................ 60/272–324
See application file for complete search history.

(56) References Cited

U.S. PATENT DOCUMENTS

| | | | | |
|---|---|---|---|---|
| 5,390,488 A | * | 2/1995 | Ament et al. | 60/274 |
| 5,444,976 A | * | 8/1995 | Gonze et al. | 60/274 |
| 5,492,190 A | * | 2/1996 | Yoshida | 180/65.245 |
| 5,493,857 A | * | 2/1996 | Komatsuda et al. | 60/284 |
| 5,785,137 A | | 7/1998 | Reuyl | |
| 5,966,931 A | * | 10/1999 | Yoshizaki et al. | 60/284 |
| 6,167,696 B1 | * | 1/2001 | Maaseidvaag et al. | 60/274 |
| 6,865,883 B2 | * | 3/2005 | Gomulka | 60/295 |
| 7,013,638 B2 | * | 3/2006 | Hiranuma et al. | 60/286 |
| 7,677,028 B2 | * | 3/2010 | Kapparos et al. | 60/286 |
| 2006/0278449 A1 | * | 12/2006 | Torre-Bueno | 180/65.2 |
| 2009/0025371 A1 | * | 1/2009 | Hermansson et al. | 60/286 |
| 2009/0165445 A1 | * | 7/2009 | Haseyama et al. | 60/286 |
| 2009/0247399 A1 | * | 10/2009 | Mizutani et al. | 502/178 |
| 2010/0290957 A1 | * | 11/2010 | Yoshida et al. | 422/109 |

FOREIGN PATENT DOCUMENTS

| | | |
|---|---|---|
| CN | 101306685 | 11/2008 |
| DE | 19740971 | 3/1998 |
| DE | 102008023394 | 1/2009 |

OTHER PUBLICATIONS

Office Action dated Nov. 14, 2012 from German Patent Office for German Patent Application No. 10 2011 100 587.4, 5 pages.

* cited by examiner

*Primary Examiner* — Kenneth Bomberg
*Assistant Examiner* — Anthony Ayala Delgado (57) ABSTRACT

A catalyst heating system includes a monitoring module, a mode selection module and an electrically heated catalyst (EHC) control module. The monitoring module monitors at least one of (i) a first active volume of a catalyst assembly in an exhaust system of an engine and (ii) a first temperature of a non-EHC of the catalyst assembly. The mode selection module is configured to select a non-EHC radiant heating mode and generate a mode signal based on the at least one of the first active catalyst volume and the first temperature. An EHC control module increases temperature of the EHC to an elevated temperature that is greater than a stabilization temperature based on the mode signal. The stabilization temperature is greater than a catalyst light off temperature.

19 Claims, 5 Drawing Sheets

HYBRID CATALYST RADIANT PREHEATING SYSTEM

FIELD

The present disclosure relates to catalytic converters of an exhaust system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Catalytic converters are used in an exhaust system of an internal combustion engine (ICE) to reduce emissions. As an example, a three-way catalyst converter (TWC) reduces nitrogen oxide, carbon monoxide and hydrocarbons within an exhaust system. The three-way converter converts nitrogen oxide to nitrogen and oxygen, carbon monoxide to carbon dioxide and oxidizes unburnt hydrocarbons to produce carbon dioxide and water.

An average light off temperature at which a catalytic converter typically begins to function is approximately 200-350° C. As a result, a catalytic converter does not function or provides minimal emission reduction during a warm up period that occurs upon a cold start up of an engine. Operating temperatures of a catalytic converter may be approximately 400-900° C. after the warm up period. Efficiency of a catalytic converter improves with an increase in operating temperature. For the stated reasons, the quicker a catalytic converter increases to the light off temperature upon a cold start the better the emission reduction performance of an exhaust system.

Hybrid electric vehicles may include an ICE and one or more electric motors. The ICE may have an exhaust system with a catalytic converter. The ICE may be deactivated repeatedly and/or for extended periods of time to conserve fuel. Temperature of the catalytic converter decreases when the ICE is deactivated. A start/stop vehicle includes and deactivates an ICE during, for example ICE idle periods and/or when velocity of the start/stop vehicle is 0 m/s. As a result, a catalytic converter may provide limited emission reduction performance upon starting of a hybrid electric vehicle and a start/stop vehicle.

SUMMARY

In one embodiment, a catalyst heating system is provided. The catalyst heating system includes a monitoring module, a mode selection module and an electrically heated catalyst (EHC) control module. The monitoring module monitors at least one of (i) a first active volume of a catalyst assembly in an exhaust system of an engine and (ii) a first temperature of a non-EHC of the catalyst assembly. The mode selection module is configured to select a non-EHC radiant heating mode and generate a mode signal based on the at least one of the first active catalyst volume and the first temperature. An EHC control module increases temperature of the EHC to an elevated temperature that is greater than a stabilization temperature based on the mode signal. The stabilization temperature is greater than a catalyst light off temperature.

In other features, a method of operating a catalyst heating system is provided and includes monitoring at least one of (i) a first active volume of a catalyst assembly in an exhaust system of an engine and (ii) a first temperature of a non-EHC of the catalyst assembly. A non-EHC radiant heating mode is selected and a mode signal is generated based on the at least one of the first active catalyst volume and the first temperature. Temperature of the EHC is increased to an elevated temperature that is greater than a stabilization temperature based on the mode signal. The stabilization temperature is greater than a catalyst light off temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
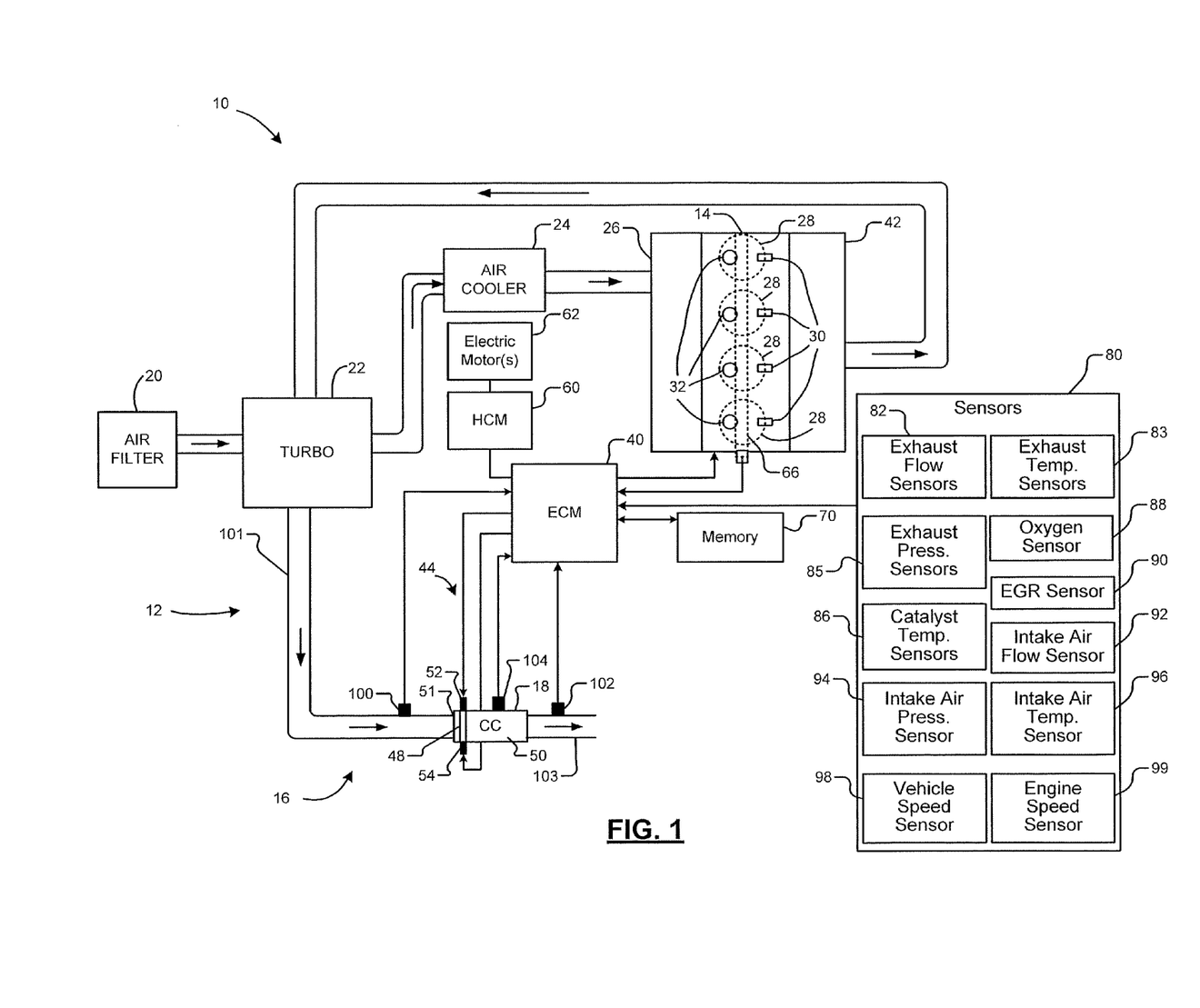
FIG. 1 is a functional block diagram of an exemplary engine system incorporating a catalyst heating system in accordance with the present disclosure.

In FIG. 1, an exemplary engine system 10 that includes a catalyst heating system 12 is shown. The engine system 10 may be a hybrid electric vehicle system, a plug-in hybrid electric vehicle system, a start/stop vehicle system, a partial zero emissions vehicle (PZEV) system, a super ultra low emissions vehicle (SULEV) system or other stricter emissions vehicle system (e.g., SULEV20), etc. The engine system 10 includes an engine 14 with an exhaust system 16. The exhaust system 16 includes a catalytic converter (CC) 18. The catalyst heating system 12 heats catalyst(s) in the CC 18 (catalyst assembly). The catalyst heating system 12 may heat the catalyst(s) before starting of the engine 14. Although the engine system 10 is shown as a spark ignition engine, the engine system 10 is provided as an example. The catalyst heating system 12 may be implemented on various other engine systems, such as diesel engine systems.

The engine system 10 includes the engine 14 that combusts an air and fuel mixture to produce drive torque. Air enters the engine 14 by passing through an air filter 20. Air passes through the air filter 20 and may be drawn into a turbocharger 22. The turbocharger 22 when included compresses the fresh air. The greater the compression, the greater the output of the engine 14. The compressed air passes through an air cooler 24 when included before entering an intake manifold 26.

Air within the intake manifold 26 is distributed into cylinders 28. Fuel is injected into the cylinders 28 by fuel injectors 30. Spark plugs 32 ignite air/fuel mixtures in the cylinders 28. Combustion of the air/fuel mixtures creates exhaust. The exhaust exits the cylinders 28 into the exhaust system 16.

The catalyst heating system 12 includes the exhaust system 16 and an engine control module (ECM) 40. The exhaust system 16 includes the CC 18, the ECM 40, the exhaust manifold 42, and a catalyst heating circuit 44. As an example, the CC 18 may include a three-way catalyst (TWC). The CC 18 may reduce nitrogen oxides NOx, oxidizes carbon monoxide (CO) and oxidizes unburnt hydrocarbons (HC) and volatile organic compounds. The CC 18 oxidizes the exhaust based on a post combustion air/fuel ratio. The amount of oxidation increases the temperature of the exhaust.

The CC 18 includes an electrically heated catalyst (EHC) 48 and a non-EHC 50. The EHC 48 is actively heated. The non-EHC 50 is passively heated through adjacent heat transfer and/or radiant heat transfer. The EHC 48 and the non-EHC 50 may refer to different portions of a single catalyst or may be distinct adjacent catalysts. For example only, the EHC 48 may have approximately 20% of the total catalyst mass of the CC 18. The non-EHC 50 may have approximately 70-80% of the total catalyst mass. An additional non-EHC 51 may be adjacent to and upstream from the EHC 48. The non-EHC 51 may increase in temperature due to adjacent and/or radiant heat transfer from the EHC 48. The EHC 48 receives a selected current and/or a selected voltage from the catalyst heating circuit 44. Electrically heating of the EHC 48 and not the non-EHC 50 allows for quick activation of the EHC 48 for off cycle emission reduction.

The catalyst heating circuit 44 includes one or more terminals. In the example shown, two terminals are provided; a supply terminal 52 and a ground or return terminal 54. In the example shown, the EHC 48 may perform as a resistive element between the terminals 52, 54 and receive current from the supply terminal 52. Temperature of the EHC 48 increases while current is supplied to the supply terminal 52. This allows the EHC 48 to increase to a functioning or active temperature (e.g., ≥a catalyst light off temperature) when the engine 14 is not activated. The engine 14 is activated when spark and fuel of the engine 14 are activated. Different voltage levels may be applied to the terminals 52, 54, such as 12V-42V. Voltage levels greater than 42V may be used. Power supplied to the terminals 52, 54 may be from a power source that includes hybrid vehicle batteries, plug-in type batteries, and/or lithium-ion batteries.

Optionally, an EGR valve (not shown) re-circulates a portion of the exhaust back into the intake manifold 26. The remainder of the exhaust is directed into the turbocharger 22 to drive a turbine. The turbine facilitates the compression of the fresh air received from the air filter 20. Exhaust flows from the turbocharger 22 to the CC 18.

The engine system 10 may also include a hybrid control module (HCM) 60 and one or more electric motor(s) 62. The HCM 60 may be part of the ECM 40 or may be a stand alone control module, as shown. The HCM 60 controls operation of the electric motor(s) 62. The electric motor(s) 62 may supplement and/or replace power output of the engine 14. The electric motor(s) 62 may be used to adjust speed of the engine 14 (i.e. rotating speed of a crankshaft 66 of the engine 14).

The catalyst heating system 12 may operate in one or more catalyst heating modes, such as an EHC radiant heating mode and a non-EHC stabilization mode. The catalyst heating system 12 may operate in the catalyst heating modes when the engine 14 is deactivated. The engine 14 is deactivated when spark and fuel to the engine 14 are disabled. The catalyst heating modes include activating the catalyst heating circuit 44 to heat the EHC 48. The ECM 40 controls current and voltage supplied to the terminals 52, 54 and heating time of the EHC 48 during the catalyst heating mode. The EHC radiant heating mode includes heating the EHC 48 to an elevated temperature associated with providing a predetermined level of radiant heat transfer to the non-EHC 50. The non-EHC stabilization mode includes decreasing temperature of the EHC 48 from the elevated temperature to a stabilization temperature. The non-EHC stabilization mode is activated to: minimize power used to heat the EHC 48 and non-EHC 50; maintain a current temperature of the non-EHC 50; and/or minimize temperature decreasing rate of the non-EHC 50 when the EHC radiant heating mode is disabled.

The catalyst heating system 12 may also be sued to increase temperature of the EHC 48 and the non-EHC 50 during a cold start of the engine 14. In this example, the catalyst heating circuit 44 heat the EHC 48 when the engine 14 is activated and operating at a speed greater than 0 meters per second (m/s).

The ECM 40 controls the engine 14 and the catalyst heating system 12 based on sensor information. The sensor information may be obtained directly via sensors and/or indirectly via algorithms and tables stored in memory 70. Some example sensors 80 for determining exhaust flow levels, exhaust temperature levels, exhaust pressure levels, catalyst temperatures, oxygen levels, intake air flow rates, intake air pressure, intake air temperature, vehicle speed, engine speed, EGR, etc are shown. Exhaust flow sensors 82, exhaust temperature sensors 83, exhaust pressure sensors 85, catalyst temperature sensors 86, an oxygen sensor 88, an EGR sensor 90, an intake air flow sensor 92, an intake air pressure sensor 94, an intake air temperature sensor 96, vehicle speed sensor 98 and an engine speed sensor 99 are shown.

A first exhaust flow, pressure and/or temperature sensor 100 may be connected to a first exhaust conduit 101 and upstream from the CC 18. A second exhaust flow, pressure and/or temperature sensor 102 may be connected to a second exhaust conduit 103 downstream from the CC 18. A catalyst temperature sensor 104 may be connected to the CC 48. The ECM 40 may control operation of the engine 14 and the catalyst heating system 12 based on the information from the sensors 80, the first and second sensors 100, 102 and the catalyst temperature sensor 104.

Figure 2:
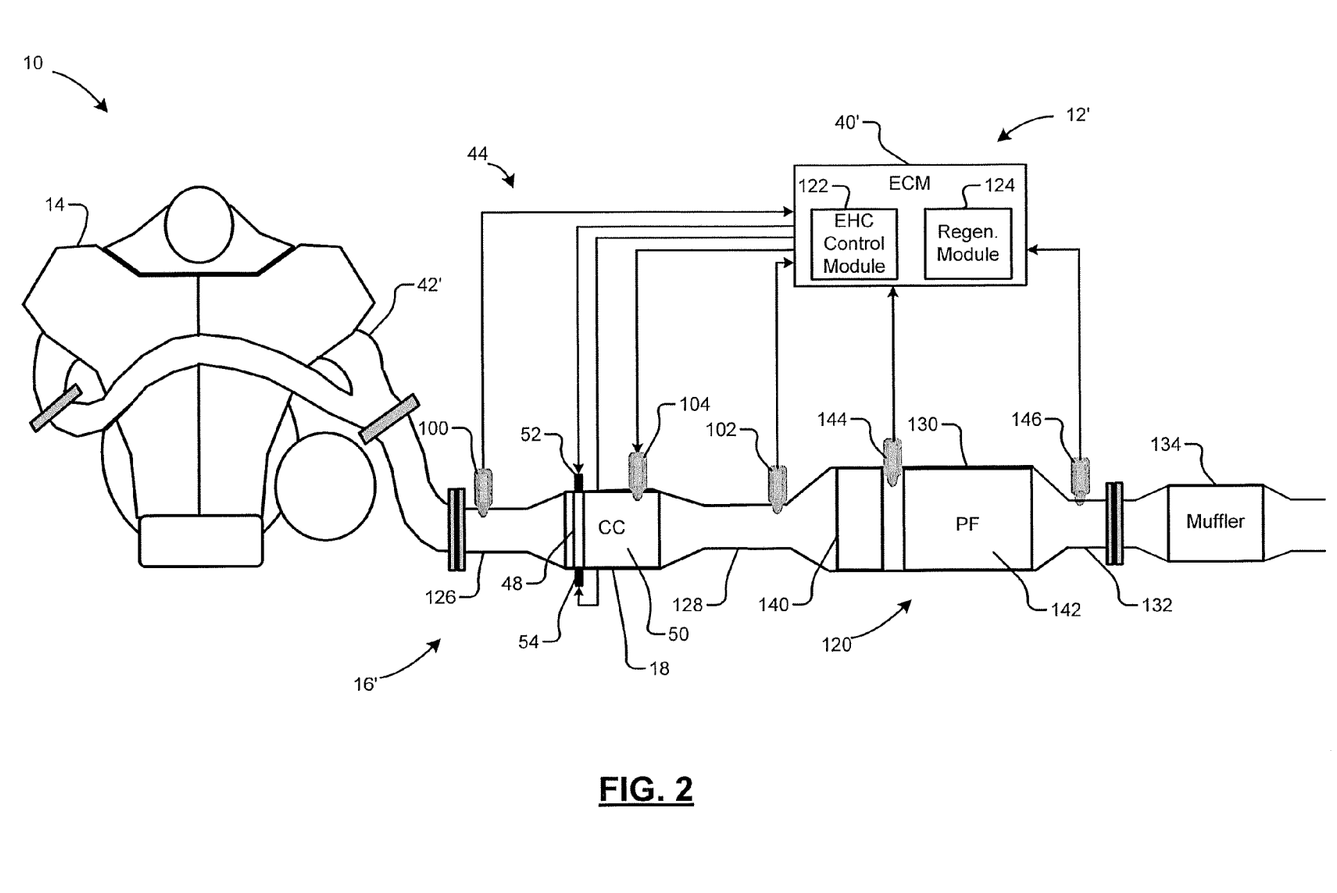
FIG. 2 is a functional block diagram of another engine system and corresponding catalyst heating system in accordance with the present disclosure.

In FIG. 2, a functional block diagram of another engine system 10' is shown. The engine system 10' may be part of the engine system 10. The engine system 10' includes the engine 14, a catalyst heating system 12', an exhaust system 16', an ECM 40' and may include a regeneration system 120. The regeneration system 120 is provided for example purposes only. Portions and/or all of the regeneration system 120 may not be included the engine system 10'.

The engine 14' may be, for example, a spark ignition or diesel engine. The ECM 40' may include an EHC control module 122 and a regeneration module 124. The EHC control module 122 controls operation of the catalyst heating system 12'. The regeneration module 124 controls operation of the regeneration system 120. In the example shown, the exhaust system 16' includes in the following order: an exhaust manifold 42', a first exhaust conduit 126, the CC 18, a second exhaust conduit 128, a catalyst and filter assembly 130, a third exhaust conduit 132, and a muffler 134.

The catalyst heating system 12' includes the engine 14, the CC 18, the catalyst heating circuit 44, and/or the EHC control module 122. The CC 18 includes the EHC 48 and the non-EHC 50. The catalyst heating circuit 44 may include the terminals 52, 54. The catalyst heating system 12' may also include the sensors 100, 102, 104.

The regeneration system 120 includes the engine 14, the regeneration module 124 and the catalyst and filter assembly 130. The catalyst and filter assembly 130 may include a catalyst 140, such as a three-way catalyst, and a particulate filter (PF) 142. The catalyst 140 oxides CO remaining in the exhaust received from the CC to generate $CO_2$. The catalyst 140 may also reduce nitrogen oxides NOx and oxidize unburnt hydrocarbons (HC) and volatile organic compounds. The PF 142 receives exhaust from the catalyst 140 and filters any soot particulates present in the exhaust. The catalyst and filter assembly 130 may include heating elements (not shown) to facilitate regeneration of the PF 142.

The regeneration module 120 may control operation of the engine 14 based on information from, for example, the second flow, pressure and/or temperature exhaust sensor 102 and/or from a third flow, pressure and/or temperature exhaust sensor 144 and a fourth flow, pressure and/or temperature exhaust sensor 146. The second exhaust sensor 102 is connected upstream from the catalyst and filter assembly 130, on the second exhaust conduit 128, and between the CC 18 and the catalyst and filter assembly 130. The third exhaust sensor 144 is connected to the catalyst and filter assembly 130. The fourth exhaust sensor 146 is connected to the third exhaust conduit 132 and downstream of the catalyst and filter assembly 130. A portion of the PF 142 may be heated to a regeneration temperature to initiate an exothermic reaction that propagates down the PF 142. This heating may be performed based on information from the exhaust sensors 102, 144, 146 and a current soot loading of the PF 132.

The ECM 40' may estimate soot loading of the PF 132. When the estimated loading is at a predetermined level and/or the exhaust flow rate is within a desired range, operation of the engine 14 and the regeneration system 120 are controlled to initiate the regeneration process. The duration of the regeneration process may be varied based upon an estimated amount of particulate matter within the PF 132.

Figure 3:
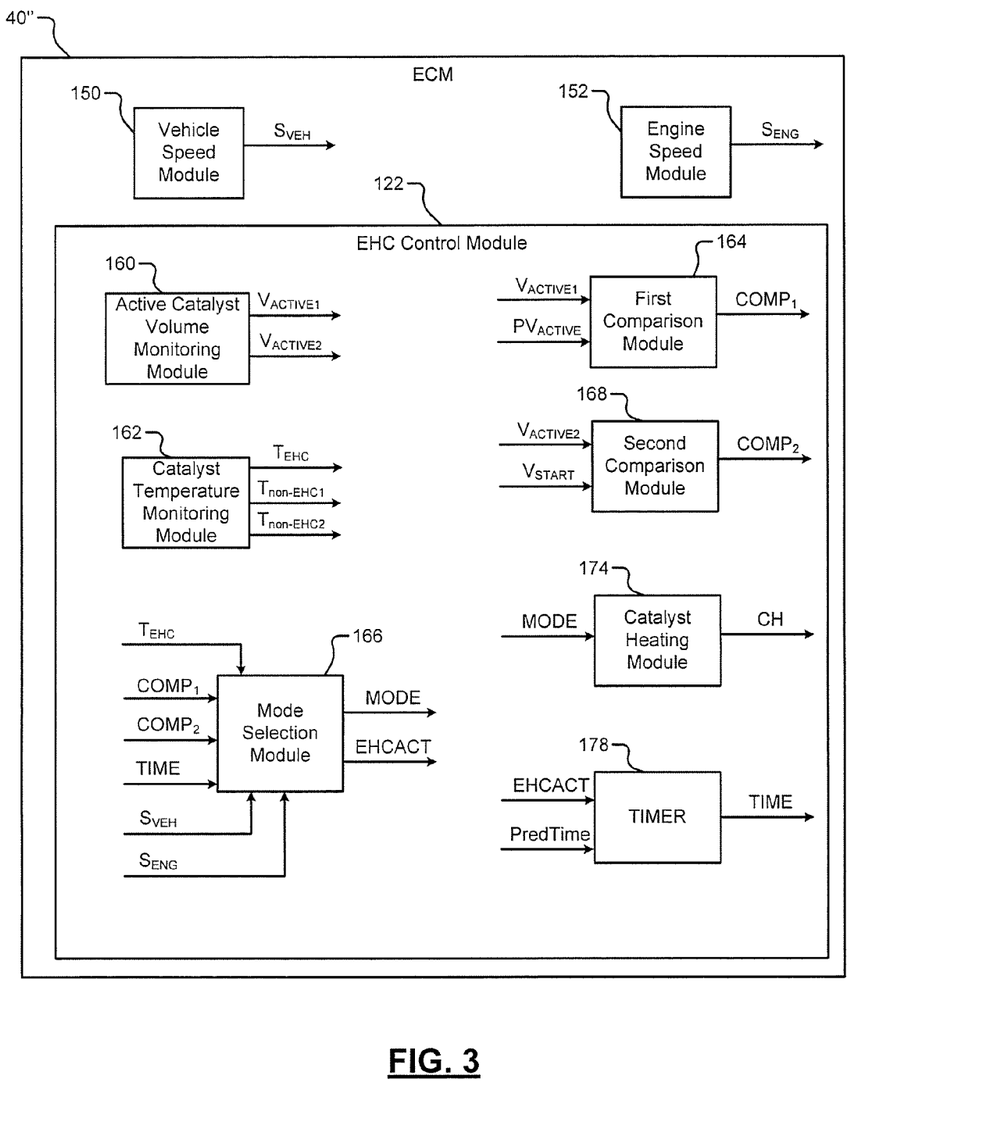
FIG. 3 is a functional block diagram of an engine control module in accordance with the present disclosure.

Referring now also to FIG. 3, a functional block diagram of an ECM 40" is shown. The ECM 40" may be used in the catalyst heating systems 12, 12' of FIGS. 1 and 2. The ECM 40" includes the EHC control module 122 and may further include a vehicle speed module 150 and an engine speed module 152. The EHC control module 122 may control operation of the engine 14 and the catalyst heating circuit 44. The vehicle speed module 150 determines speed of a vehicle based on information from, for example, the vehicle speed sensor 98. The engine speed module 152 determines speed of the engine 14 based on information from, for example, the engine speed sensor 99.

The EHC control module 122 includes an active catalyst volume monitoring module 160, a catalyst temperature monitoring module 162, a mode selection module 164, a first comparison module 166, a second comparison module 168, a catalyst heating module 174, and a timer 178. The EHC control module 122 operates in the catalyst heating modes, which are selected by the mode selection module 166. The EHC control module 122 may operate in more than one of the modes during the same period.

Figure 4:
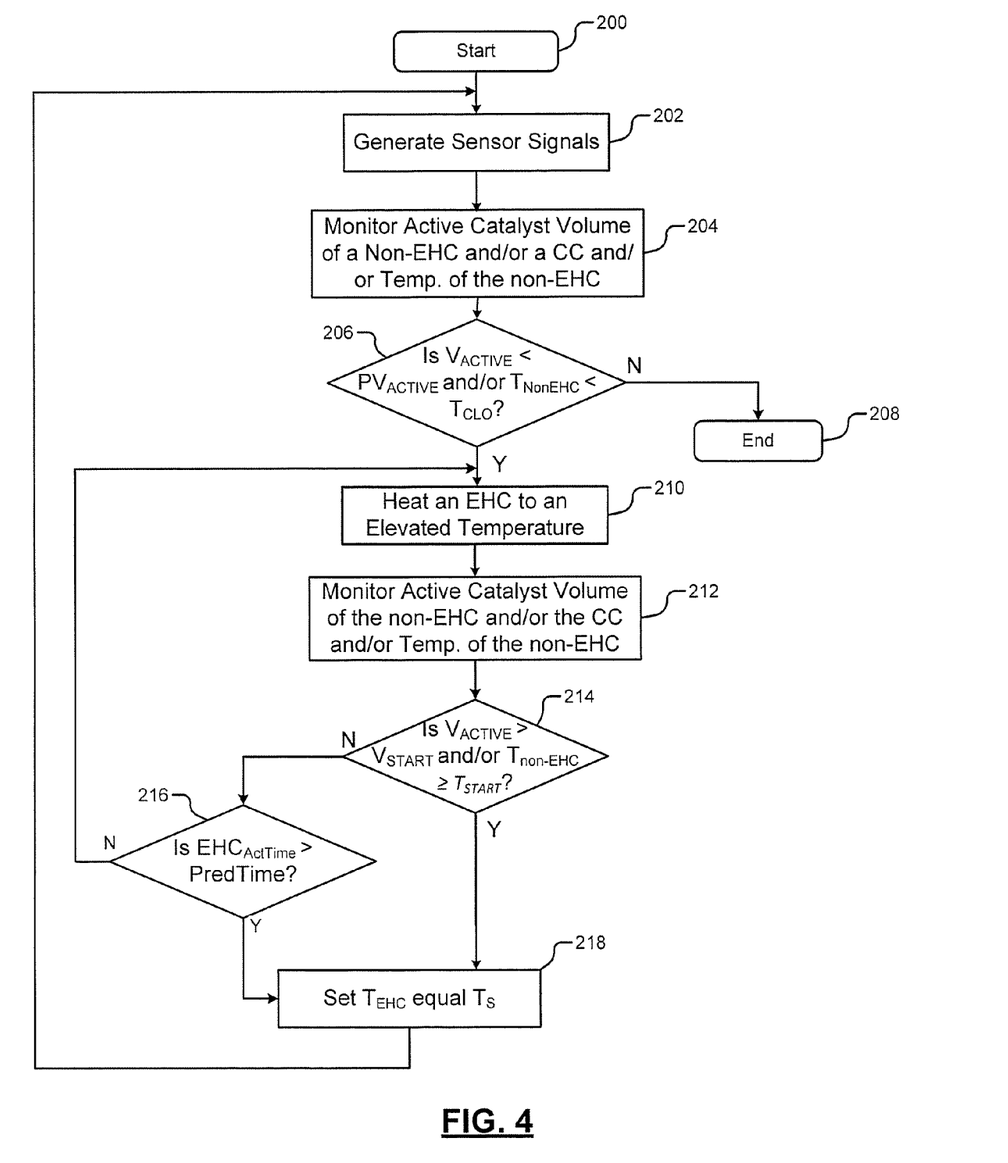
FIG. 4 illustrates a method of operating a catalyst heating system in accordance with the present disclosure.

Referring now also to FIG. 4, a method of operating a catalyst heating system is shown. Although the method is described with respect to the embodiments of FIGS. 1-3, the method may be applied to other embodiments of the present disclosure. The method may begin at 200 and may end during any of the below-described tasks 202-218 when, for example, the engine 14 is activated. The below-described tasks 202-218 may be iteratively performed and may be performed by one of the ECMs 40, 40', 40" of FIGS. 1-3.

At 202, sensor signals are generated. The sensor signals may include exhaust flow signals, exhaust temperature signals, exhaust pressure signals, catalyst temperature signals, an oxygen signal, an intake air flow signal, an intake air pressure signal, an intake air temperature signal, a vehicle speed signal, an engine speed signal, an EGR signal, etc., which may be generated by the above-described sensors 80 and 100-104, 144, 146 of FIGS. 1 and 2.

At 204, the active volume monitoring module 160 monitors an active catalyst volume of the CC 18 and generates a first active catalyst volume signal $V_{ACTIVE1}$. In addition to or as an alternative to monitoring the active catalyst volume, the catalyst temperature monitoring module 162 may monitor a first temperature (or a first temperature signal) $T_{non-EHC1}$ of the non-EHC 50. The first active catalyst volume signal $V_{ACTIVE1}$ may be estimated using, for example, equation 1.

$$V_{ACTIVE1} = f\{T_{non-EHC1}, RE, CondRate, S_{ENG}, DC, C_{Mass}, EHC_{ActTime}, EHC_{Current}, EHC_{Volt}\} \quad (1)$$

The first temperature signal $T_{non-EHC}$ may be directly determined via, for example, the exhaust sensor 102. As an alternative, the first temperature signal $T_{non-EHC1}$ may be indirectly estimated using, for example, equation 2.

$$T_{non-EHC1} = f\{RE, CondRate, S_{ENG}, DC, C_{Mass}, EHC_{ActTime}, EHC_{Current}, EHC_{Volt}\} \quad (2)$$

RE is radiant energy transferred from the EHC 48 to the non-EHC 50. RE may be estimated based on EHCActTime, EHCCurrent, $EHC_{Volt}$, and/or resistance of the EHC 48. CondRate is conduction rate of the non-EHC 50. An example unit-of-measure for radiant energy is Joules (J). RE may also be determined using, for example, equations 3 and 4, where $\alpha$ is Bolztman's constant.

$$RE = \alpha(\Delta T)^4 \quad (3)$$

$$\Delta T = T_{EHC} - T_{non-EHC} \quad (4)$$

$S_{ENG}$ is speed of the engine 14 (i.e. rotational speed of the crankshaft 66). DC is duty cycle of the engine. $C_{Mass}$ is mass of the EHC 48 and/or the non-EHC 50 or total mass of the catalysts of the CC 18. $EHC_{ActTime}$ is time that the catalyst heating system 12 is activated. $EHC_{Current}$ is current level applied to the EHC 48. $EHC_{Volt}$ is voltage applied to the EHC 48. The first active volume $V_{ACTIVE1}$ and the first temperature $T_{non-EHC1}$ may be determined based on one or more of the engine system parameters of equations 1 and 2 and/or other engine system parameters, such as EHC resistance and/or impedance, ambient air temperature, mass of the EHC 48, etc.

At 206, the first comparison module 164 compares the first active volume $V_{ACTIVE1}$ with a predetermined active volume $PV_{ACTIVE}$ and generates a first comparison signal $COMP_1$. The predetermined active volume $PV_{ACTIVE}$ refers to a target catalyst volume of the non-EHC 50 and/or CC 18 that is at a temperature that is greater than or equal to an active catalyst temperature (temperature at which the catalyst is functioning and reducing emissions or the catalyst light off temperature). As an example, the target catalyst volume may be approximately 30-40% of the non-EHC 50 and/or the 30-40% of the total catalyst volume of the CC 18. The predetermined active volume $PV_{ACTIVE}$ may be associated with a minimum active volume desired before startup of the engine 14.

At 206, in addition to or as an alternative to generating the first comparison signal based on the first active catalyst volume signal $V_{ACTIVE1}$, the first comparison module 164 may compare the first temperature $T_{non-EHC1}$ to a catalyst light off temperature $T_{CLO}$. The first comparison module 164 generates a first comparison signal $COMP_1$ based on the comparison. The catalyst light off temperature $T_{CLO}$ may be, for example, between 200-350° C. In one embodiment, the CLO temperature $T_{CLO}$ is approximately 250° C.

Control may end at 208 when the first active catalyst volume signal $V_{ACTIVE1}$ is not less than the predetermined active volume $PV_{ACTIVE}$ and/or the first temperature signal $T_{non-EHC1}$ is not less than the catalyst light off temperature $T_{CLO}$, otherwise control may proceed to 210. As an alternative to ending at 208, control may return to 202.

At 210, the mode selection module 166 selects the EHC radiant heating mode and generates a mode selection signal MODE based on the first comparison signal $COMP_1$. The catalyst heating circuit 44 is activated to heat the EHC 48 to an elevated temperature $T_E$. The mode selection module 166 may generate an EHC activate signal EHCACT to start the timer 178 when the EHC 48 is activated.

As an example, the elevated temperature $T_E$ may be greater than or equal to approximately 700° C. The elevated temperature $T_E$ may be selected based on a target non-EHC temperature (e.g., 400° C.), size and mass of the EHC 48 and the non-EHC 50, current and/or voltage applied to the EHC 48, conduction rates of the EHC 48 and non-EHC 50, etc. The elevated temperature $T_E$ may be an overheat temperature at which the EHC 48 may begin to breakdown if maintained at the elevated temperature $T_E$ for longer than a predetermined time PredTime. For example only, the non-EHC 50 may be radiantly heated by the EHC 48 to a temperature of greater than or equal to approximately 400° C. when the EHC 48 is at a temperature greater than or equal to 700° C., depending upon the size, mass, and conduction rates of the EHC 48 and non-EHC 50.

The catalyst heating module 174 generates a catalyst heating signal CH based on the mode selection signal MODE. The catalyst heating signal CH may indicate a selected current and/or voltage to apply to terminals of the catalyst heating system 12. The catalyst heating signal CH indicates respective currents and/or voltages for the EHC radiant heating mode and the EHC stabilization mode. The catalyst heating mode may be selected based on the engine speed $S_{ENG}$ and/or a vehicle speed $S_{VEH}$. As an example, catalyst heating mode may be selected when the engine speed is less than a predetermined engine speed. As another example, the catalyst heating mode may be selected when the engine speed is approximately 0 revolutions-per-minute (RPM).

At 212, the active volume monitoring module 162 monitors the active catalyst volume of the non-EHC 50 and/or the CC 18 and generates a second active catalyst volume signal $V_{ACTIVE2}$. In addition to or as an alternative to monitoring the active catalyst volume, the catalyst temperature monitoring module 162 may monitor a second temperature $T_{non-EHC2}$ of the non-EHC 50. The second active catalyst volume signal $V_{ACTIVE2}$ and the second temperature $T_{non-EHC2}$ may be determined similar to the first active catalyst volume signal $V_{ACTIVE1}$ and the first temperature $T_{non-EHC1}$.

At 214, the second comparison module 168 monitors compares the second active catalyst volume signal $V_{ACTIVE2}$ to a start volume $V_{START}$ and generates a second comparison signal $COMP_2$. In addition to or as an alternative to generating the first comparison signal based on the second active catalyst volume signal $V_{ACTIVE2}$, the second comparison module 164 may compare the second temperature $T_{non-EHC2}$ to a start temperature $T_{START}$. The second comparison signal $COMP_2$ may be generated based on the comparison between the second temperature $T_{non-EHC2}$ to a start temperature $T_{START}$. The start temperature $T_{START}$ may refer to a target start temperature of the non-EHC 50 when the engine 14 is started. The start temperature $T_{START}$ may be greater than or equal to the catalyst light off temperature. Control proceeds to 216 when the second active catalyst volume signal $V_{ACTIVE2}$ is not greater than the start volume $V_{START}$ and/or when the second temperature $T_{non-EHC2}$ is not greater than or equal to the start temperature $T_{START}$, otherwise control may proceed to 218.

At 216, the mode selection module 166 may determine whether the EHC 48 is activated longer than the predetermined time PredTime. The mode selection module 166 may select the stabilization mode based on a time signal TIME from the timer 178. The mode selection module 166 may switch to the stabilization mode when temperature of the EHC 48 $T_{EHC}$ is greater than an overheat or breakdown temperature and the activated time of the EHC 48 $EHC_{ActTime}$ is greater than or equal to the predetermined time PredTime. This prevents breakdown of the EHC 48. The temperature of the EHC 48 $T_{EHC}$ may be determined by the catalyst temperature monitoring module 162. The temperature of the EHC 48 $T_{EHC}$ may be directly determined via an EHC temperature sensor and/or indirectly determined using equation 5, where $EHC_{Mass}$ is the mass of the EHC 48.

$$T_{EHC}=f\{S_{ENG}, DC, EHC_{Mass}, EHC_{ActTime}, EHC_{Current}, EHC_{Volts}\} \quad (5)$$

At 218, the catalyst heating module 174 decreases temperature of the EHC 48 via the catalyst heating circuit 44 to a stabilization temperature $T_S$. The stabilization temperature $T_S$ is less than the elevated temperature $T_E$ and is greater than the catalyst light off temperature $T_{CLO}$. The stabilization temperature $T_S$ may be greater than or equal to the start temperature $T_{START}$. For example only, the stabilization temperature may be greater than or equal to approximately 400° C. Temperature of the EHC 48 is reduced to conserve power and minimize time that the EHC 48 is at the elevated temperature. Control may end after 216 or may return to 202 as shown.

The above-described tasks performed at 202-218 are meant to be illustrative examples; the tasks may be performed sequentially, synchronously, simultaneously, continuously, during overlapping time periods or in a different order depending upon the application. The above-described tasks are performed to heat and maintain temperature of catalysts of a catalyst assembly at or greater than a catalyst light off temperature.

Figure 5:
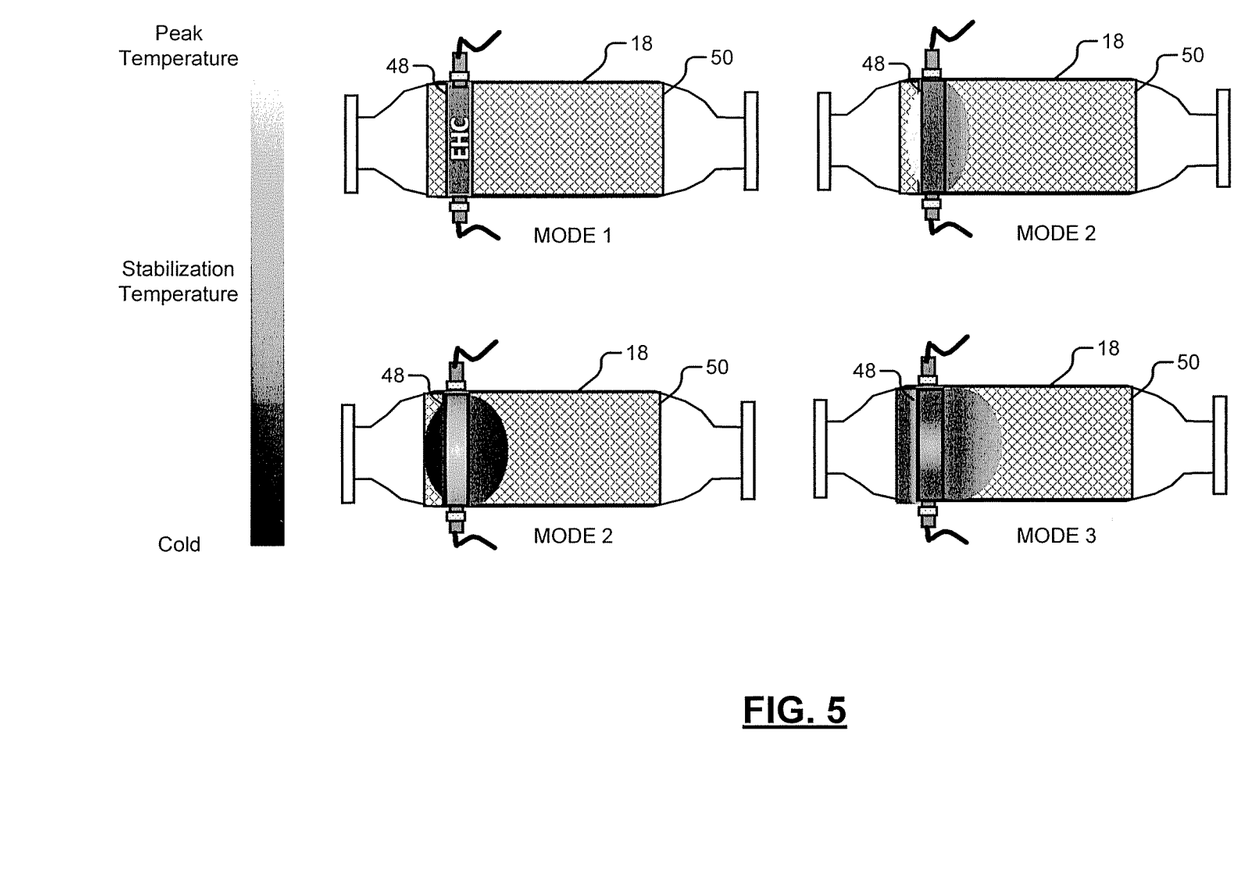
FIG. 5 is a thermal catalyst assembly diagram illustrating three modes of the method of FIG. 4.

In FIG. 5, a thermal catalyst assembly diagram illustrating three modes MODE 1-3 of the method of FIG. 4 is shown. The thermal catalyst diagram includes the CC 18 with the EHC 48 and the non-EHC 50.

In mode 1, the EHC 48 is deactivated. In MODE 2, a catalyst heating circuit (e.g., the catalyst heating circuit 44 of FIG. 1) is activated to heat the EHC 48 to the elevated temperature $T_E$. The heating may be provided by a wall source, such as a battery. The heating may not be provided via fueling of an engine, which conserves fuel. In MODE 2, control is operating in the EHC radiant heating mode. For MODE 2, the CC 18 is shown at a first time and at a second time, which occurs after the first time. At the second time, the EHC 48 is providing mode radiant heating than at the first time. MODE 3 is performed after MODE 2 and includes maintaining activation of the catalyst heating circuit, but operating in the EHC stabilization mode and not the EHC radiant heating mode.

The above-described embodiments allow for quick heating of a catalyst without enabling fuel of an engine and heating of the engine. As a result, catalysts of an exhaust system are heated and/or are active (total catalyst heated volume is increased) before starting the engine. As the catalysts are heated before the engine is started, fuel is not used to heat the catalysts. The embodiments also limit excessive engine run time needed to diagnose catalyst light off. The above-described embodiments reduce emission output of the engine by target catalyst heating before activation of an engine and without use of fuel.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A catalyst heating system comprising:
a first electronic circuit configured to monitor a first temperature of a non-electrically heated catalyst (EHC) of a catalyst assembly in an exhaust system of an engine, wherein the EHC is actively heated by supplying an electrical current to the EHC;
a second electronic circuit configured to select a non-EHC radiant heating mode and generate a mode signal based on the first temperature, wherein the non-EHC is not supplied an electrical current and is passively or radiantly heated by the EHC;
a third electronic circuit configured to increase a temperature of an EHC of the catalyst assembly to an elevated temperature that is greater than a stabilization temperature based on the mode signal,
wherein the stabilization temperature is greater than a catalyst light off temperature;
a fourth electronic circuit configured to compare the first temperature to a catalyst light off temperature and generate a first comparison signal,
wherein the second electronic circuit is configured to select the EHC radiant heating mode when the first comparison signal indicates that the first temperature is less than the catalyst light off temperature; and
a fifth electronic circuit configured to compare a second temperature of the non-EHC to a start temperature and generate a second comparison signal,
wherein the start temperature is a minimum temperature requested for the non-EHC before starting the engine, and
wherein the second electronic circuit is configured to select the EHC stabilization mode when the second comparison signal indicates that the second temperature is greater than the start temperature.

2. The catalyst heating system of claim 1, wherein:
the third electronic circuit is configured to supply current to the EHC via a EHC heating circuit to increase the temperature of the EHC when the engine is deactivated; and
the engine is deactivated when spark and fuel of the engine are disabled.

3. The catalyst heating system of claim 1, wherein the third electronic circuit is configured to:
increase temperature of the EHC to the elevated temperature during the EHC radiant heating mode; and
decrease temperature of the EHC to the stabilization temperature during the EHC stabilization mode.

4. The catalyst heating system of claim 1, further comprising the EHC,
wherein the EHC radiantly heats the non-EHC during the radiant heating mode, and
wherein the EHC provides less radiant heating of the non-EHC during the EHC stabilization mode than during the radiant heating mode.

5. The catalyst heating system of claim 1, wherein:
the start temperature is greater than the catalyst light off temperature; and
the start temperature is less than the elevated temperature.

6. The catalyst heating system of claim 1, further comprising the catalyst assembly, wherein:
the catalyst assembly comprises the non-EHC and the EHC;
the EHC is upstream from the non-EHC; and
the third electronic circuit is configured to control transfer of heat from the EHC to the non-EHC during the radiant heating mode.

7. The catalyst heating system of claim 1, the third electronic circuit is configured to increase temperature of the EHC of the catalyst assembly to the elevated temperature based on an engine speed signal.

8. The catalyst heating system of claim 1, the third electronic circuit is configured to increase temperature of the EHC of the catalyst assembly to the elevated temperature when speed of the engine is less than a predetermined speed.

9. A method of operating a catalyst heating system comprising:
monitoring a first temperature of a non-electrically heated catalyst (EHC) of a catalyst assembly of an engine;
if the first temperature is less than a light off temperature of the non-EHC, selecting a non-EHC radiant heating mode and generating a mode signal;
based on the mode signal, increasing a second temperature of an EHC of the catalyst assembly to an elevated temperature that is greater than a stabilization temperature for a first predetermined period to (i) radiantly heat the non-EHC, and (ii) increase the first temperature of the non-EHC to an operating target temperature, wherein the operating target temperature is greater than the light off temperature of the non-EHC; and
decreasing the second temperature of the EHC from the elevated temperature subsequent to the first predetermined period to prevent breakdown of the non-EHC or the EHC,
wherein the stabilization temperature is greater than the light off temperature of the non-EHC,
wherein the non-EHC begins to breakdown if the first temperature of the non-EHC is greater than or equal to the elevated temperature for a second predetermined period or the EHC begins to breakdown if the second temperature of the EHC is greater than or equal to the elevated temperature for the second predetermined period, and
wherein the first predetermined period is less than the second predetermined period.

10. The catalyst heating system of claim 1, wherein:
the third electronic circuit increases the temperature of the EHC to the elevated temperature for a first predetermined period; and
at least one of the EHC and the non-EHC begin to breakdown if a temperature of the at least one of the EHC and the non-EHC is greater than or equal to the elevated temperature for a second predetermined period.

11. The catalyst heating system of claim 1, wherein the first electronic circuit is a same electronic circuit as at least one of the second electronic circuit, the third electronic circuit, the fourth electronic circuit, and the fifth electronic circuit.

12. The catalyst heating system of claim 1, wherein each of the first electronic circuit, the second electronic circuit, the third electronic circuit, the fourth electronic circuit, and the fifth electronic circuit includes at least one of an electronic circuit, an application specific integrated circuit, a processor, memory, and a combinational logic circuit.

13. A catalyst heating system comprising:
a first electronic circuit configured to monitor a first temperature of a non-electrically heated catalyst (non-EHC) in a catalyst assembly in an exhaust system of an engine;
a second electronic circuit configured to, if the first temperature is less than a light off temperature of the non-EHC, select a non-EHC radiant heating mode and generate a mode signal; and
a third electronic circuit configured to, based on the mode signal,
increase a second temperature of an EHC of the catalyst assembly to an elevated temperature that is greater than a stabilization temperature for a first predetermined period to (i) radiantly heat the non-EHC, and (ii) increase the first temperature of the non-EHC to an operating target temperature, wherein the operating target temperature is greater than the light off temperature of the non-EHC, and
decrease the second temperature of the EHC from the elevated temperature subsequent to the first predetermined period to prevent breakdown of the non-EHC or the EHC,
wherein
the stabilization temperature is greater than a catalyst light off temperature, and
the non-EHC begins to breakdown if the first temperature of the non-EHC is greater than or equal to the elevated temperature for a second predetermined period or the EHC begins to breakdown if the second temperature of the EHC is greater than or equal to the elevated temperature for the second predetermined period, and
the first predetermined period is less than the second predetermined period.

14. The method of claim 9, wherein:
the EHC begins to breakdown if the first temperature of the EHC is greater than or equal to the elevated temperature for the second predetermined period; and
the non-EHC begins to breakdown if the second temperature of the non-EHC is greater than or equal to the elevated temperature for the second predetermined period.

15. The method of claim 9, wherein:
the EHC is actively heated by supplying an electrical current to the EHC; and
the non-EHC is not supplied an electrical current and is passively or radiantly heated by the EHC.

16. The method of claim 9, further comprising disabling fuel supplied to the engine while operating in the non-EHC radiant heating mode.

17. The catalyst heating system of claim 13, wherein:
the EHC begins to breakdown if the first temperature of the EHC is greater than or equal to the elevated temperature for the second predetermined period; and
the non-EHC begins to breakdown if the second temperature of the non-EHC is greater than or equal to the elevated temperature for the second predetermined period.

18. The catalyst heating system of claim 13, wherein:
the EHC is actively heated by supplying an electrical current to the EHC; and
the non-EHC is not supplied an electrical current and is passively or radiantly heated by the EHC.

19. The catalyst heating system of claim 13, further comprising a fourth electronic circuit configured to disable fuel supplied to the engine while operating in the non-EHC radiant heating mode.

* * * * *